Oct. 24, 1967  R. NOUEL  3,348,267
SECURING DEVICE FOR ROTARY MOLD APPARATUS
Filed Jan. 21, 1963  2 Sheets-Sheet 2

United States Patent Office 3,348,267
Patented Oct. 24, 1967

3,348,267
SECURING DEVICE FOR ROTARY
MOLD APPARATUS
Robert Nouel, Villejuif, Seine, France, assignor, by mesne assignments, to Inventions Finance Corporation, New York, N.Y., a corporation of Delaware
Filed Jan. 21, 1963, Ser. No. 252,942
5 Claims. (Cl. 18—20)

This application is a continuation-in-part of my three applications Ser. No. 173,103 filed Feb. 13, 1962, Ser. No. 206,508, filed June 29, 1962, and Ser. No. 215,982, filed Aug. 9, 1962, now Patent Nos. 3,241,187, 3,241,827, and 3,242,249, respectively.

This invention relates to rotary-type apparatus adapted to automatically form articles, and finds particular utility when utilized in conjunction with a rotary blowing or casting machine of the type wherein a plurality of operable split sectional or multi-part molds are sequentially moved intermittently to a plurality of arcuately separated stations.

In certain conventional molding and casting machines, and particularly in molding machines of the so-called "blow molding" type, it is customary to provide a plurality of split molds mounted on a rotatable structure, set in a horizontal or vertical plane, and to selectively advance the rotatable structure so as to sequentially move the operable split molds from one arcuate position to another arcuate position. Normally, in one of such positions, any given split mold is filled with, or placed in surrounding relation to, material utilized in forming an article therein, and at least at one other arcuately spaced position, each of the split molds is fully opened for removal of the formed article therefrom. Thus, if, for example, six split or multi-part molds are provided in the automatic article forming machine, then the same are arcuately spaced with their centers separated by sixty arcuate degrees, and the support structure or table carrying the molds is movable to six rotational positions. Each split mold is therefrom successively advanced from a first position to a sixth position. The operation in this regard is normally referred to as a "turret-type" operation; since, in effect, the separable split molds are supported on a rotatable turret-like structure.

A feeding mechanism is disposed at one of the six positions or stations, in accordance with this example; and as each mold then closed, reaches such one position or station, the same receives the material used in forming the ultimate article. In some operations, the material can be received within the closed multi-part mold at one station and then form the blown or finished part at another station; whereas in other operations the material is received and the finished article formed at a single station.

It is to be understood from the outset, however, that six stations are merely used hereinabove and hereinbelow for exemplary purposes, and that the invention is applicable to any type of article forming equipment wherein split molds or sectional type mold means are selectively advanced from any number of stations. Moreover, it is to be understood that the invention is applicable to existing machines, as well as to machines which are initially specially constructed in accordance with the invention.

Regardless of the particular feed operation, and regardless of the number of stations in any molding or casting machine, including machines of the "blow molding" type, it is necessary to maintain the separable parts of the multi-part mold in tight engagement with each other while the article is being formed therein. The mold parts are normally subjected to internal pressures tending to separate said parts, and for good product quality no separation can be permitted to occur. It is a known fact that the injection blow molding methods produce the best finished articles when removed from the molds without secondary operations or added labor. The main disadvantage with this system being the expensive tooling and the over-sized equipment needed. In order to withstand the high pressure and maintain the separable parts of the mold in engagement, a plurality of bulky and expensive means such as toggles, etc., have been necessary to force and maintain the separable parts of the mold together, and such means have proved costly and otherwise unsatisfactory due, for example, to the "play" or lost motion permitted therein.

Consistent with one form of prior construction, oppositely acting hydraulic piston-cylinder or toggle systems are provided to force the separable mold parts together during the pressure forming operation. In this instance, whether the pressing units are operated by air, hydraulic fluid, or other pressure transmitting means, the force which is applied to the mold sections by such pressing units necessarily determines the maximum separation force which can be tolerated within a particular mold. Thus, the size of the overall apparatus is dependent upon the size and power of the pressing units which are utilized to force or maintain the mold components together and therefore to manufacture articles of any substantial size, it has been necessary to provide an overall machine of bulky or substantial size.

With any of the known techniques heretofore utilized in achieving proper maintenance of the mold parts in engagement, the basic requirement to be met is the provision of some means which will effectively and efficiently maintain each set of mold components together in engagement. More specifically, if, for example, six split molds are utilized and a piston means is used to maintain the sections of each together in engagement, as aforesaid, then twelve piston-cylinder mechanisms must be provided, one for each of the sections of the split molds. Similarly, if six split molds are utilized, and a toggle mechanism is incorporated to maintain the mold parts in engagement, then twelve toggle mechanisms must correspondingly be incorporated.

In contrast with the known arrangements of the prior art, one of the primary objects of the present invention is to provide in a rotational type machine for automatically forming articles, an assembly which permits the use of a sequentially operable single means for maintaining the movably supported separable parts of split molds in engagement as each mold advances to a given position, regardless of the number of split or multi-part molds incorporated in the machine. In other words, the invention is concerned, in one basic aspect, with providing a rotational machine of the above described type which incorporates a single means for locking and maintaining the advancing split portions of each mold together in engagement while the molds are being subjected to high internal separation pressures.

Still a further object of the present invention is to provide a machine conforming with the preceding object wherein independent relatively low power means are utilized for opening and closing the split molds, and a separate means is utilized for clamping and maintaining the split molds closed during the time that the same are subjected to the separation forces. Consistent with this object, yet a further object of the present invention is to provide such a machine wherein the means for maintaining the split molds closed comprise small low-power consumption force applying devices.

An additional, yet important other object of the present invention is to provide an arrangement for use in a machine in accordance with the preceding objects, but wherein the force applied by the clamping means is adjustable from operation to operation so that the machine can be utilized in the formation of articles of differing size and shape without loss of power and without other inefficiencies.

While structurally the aforesaid objects are of primary importance, from the practical standpoint, the invention has as its primary object the provision of locking or closure maintaining arrangements for use with separable molding device rotational machines for forming articles, which arrangements permit a substantial reduction in the overall size of the machine, a substantial reduction in the overall cost of a machine, and a substantial increase in the efficiency of the machine, while at the same time reducing the required maintenance of the machine. Still further, from the practical standpoint, an additional object hereof is to provide such a machine wherein all of the aforesaid advantages can be obtained; and simultaneously, there can be achieved an increase in the article production rate over existing machines, with equal if not improved quality of the ultimate product.

Aside from the basic objects hereinabove discussed, the present invention is designed to facilitate the construction of the versatile types of plastic forming machines now coming into more wide-spread use and replacing the single purpose type machines. Specifically, the invention finds increased utility in combinations wherein clamping systems and injection systems are integrated on the same frame; in combinations where the overall operation performed may selectively be of an injection or compression nature, of an extrusion nature, or of a blowing nature; and in combinations wherein the mold components are usable as a thermoset compression press or a clamping assembly for blow molding. Still further, the invention may be of importance in apparatus which can act both as a production extruder or as an extruder-accumulator for blow molding.

In addition to the above, the invention is particularly useful in machines adapted to form multiple size components and in machines wherein variable molding control is required, such as in machines where reinforced plastics are to be shaped. Still further, the utility of the invention is significant in units wherein minimum deflection of the press members is required and maximum accuracy in the guided movement of the operable mold sections is desired.

The invention lies in the combination, arrangement and dispositions of various parts of the assembly provided hereby and will be better understood when consideration is given to the following detailed description. Such description refers to the annexed drawings presenting preferred and illustrative embodiments of the invention. In the drawings:

FIGURE 5 is a schematic diagram illustrating the sequential movements experienced by the clamping devices incorporated in the embodiments of FIGURES 1 and 2.

Figure 1:
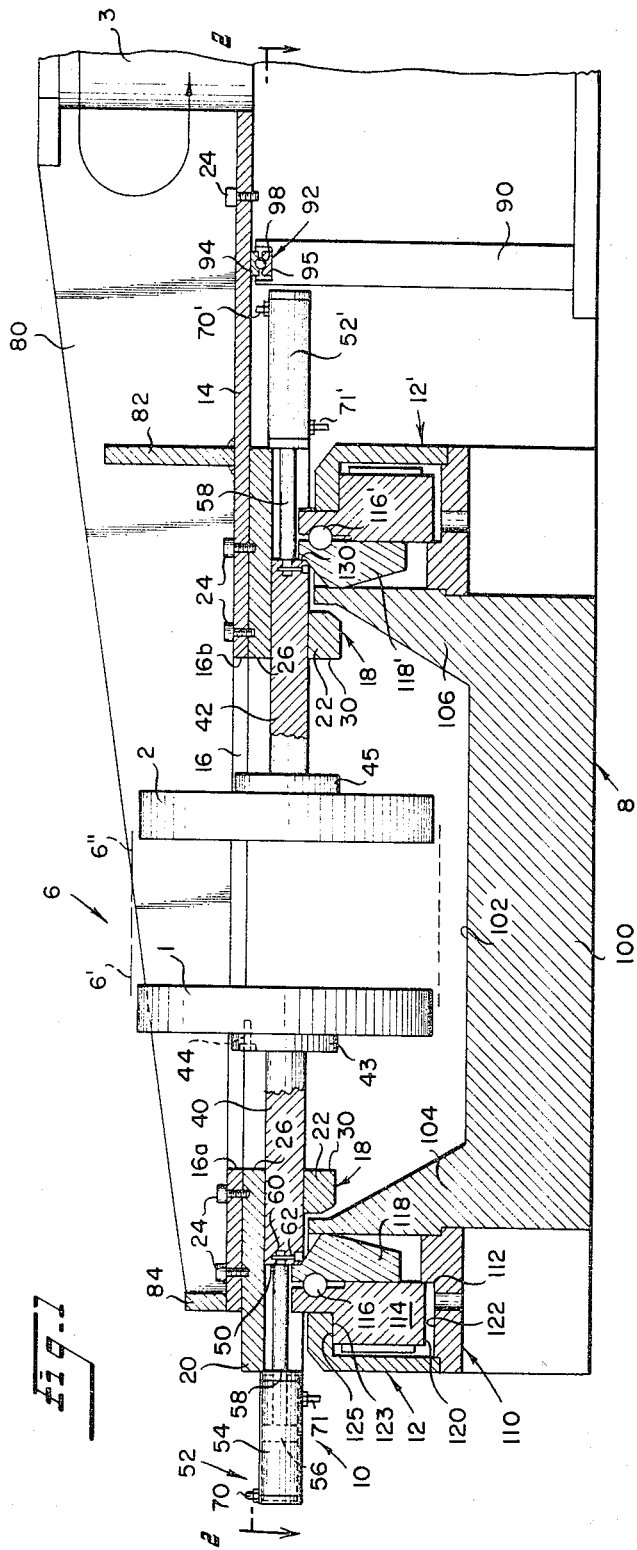
FIGURE 1 is a side sectional view of a rotational article forming machine constructed in accordance with the preferred embodiment hereof.

Reference is now made to FIGURE 1, wherein the rotational shaft of a rotary article forming machine is schematically shown therein and designated by the numeral 3. Secured to shaft 3 for rotation therewith is a support structure 4. A plurality of multi-part of sectional mold means such as the split mold generally designated by the numeral 6, comprised of sections 6', 6'', are incorporated and carried by platens 1, 2; means generally designated by the number 8 are provided for supporting the mold means on the support structure 4. A piston and cylinder means generally designated by the numeral 10 is provided for moving each of the mold means into and out of closing position. Additionally, force applying and securing devices 12 are provided for maintaining the separable mold sections closed when the mold is disposed in at least one predetermined rotational position.

Figure 2:
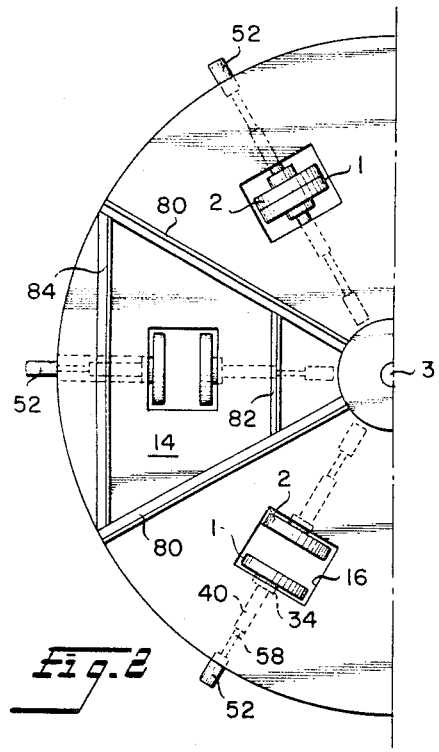
FIGURE 2 is a plan view taken on the line 2—2 of FIGURE 1.

The support structure 4 includes a plate member 14 having, as shown in FIGURE 2, a plurality of generally rectangular, arcuately spaced openings 16 therein. Fixed below the support structure 4 or plate 14, and at opposite ends of the opening 16, are a pair of slide support brackets 18 and 18'. Each of the slide support brackets 18 and 18' includes a base section 20 and an integral enlarged head or flanged section 22. The base section 20 is fixed to the underside of the plate 14 by means of bolts 24, and each of the brackets includes therein a guideway or bore 26. The brackets 18 and 18' are identical in construction, and it is to be noted that the forward or inner end 30 of each of the brackets 18 and 18' nearest the mold 6 comprises a flat face aligned with the corresponding end 16a and 16b respectively of the opening 16.

Slidable within the guideway 26 of each of the brackets 18 and 18' is a reciprocally mounted slide member, 40 and 42, respectively, preferably of T-shape in longitudinal section. The slide members 40 and 42 are respectively reciprocal in the brackets 18 and 18', and have affixed to the respective forward ends thereof the mold platens 1, 2.

The platen 1, as shown, is fixed to the head piece 43 of the slide member 40 by means of a plurality of bolts 44 which are arcuately spaced about the head piece 43. Similarly, the mold platen 2 is fixed to the head piece 45 of the slide member 42 by a plurality of similar bolts. Thus, the mold plates 1 and 2 are reciprocally movable with the slide members 40 and 42. Of course, as shown, the mold platens 1 and 2 project into the opening 16, and the sides of such openings serve as guides for the mold platens and the separable, complementary mold sections carried thereby.

Coupled to the outer ends 50 and 51 respectively of the slide members 40 and 42 respectively are mold opening and closing piston and cylinder means generally designated by the numerals 52 and 52'. The piston and cylinder means 52 includes a cylinder 54 and a piston 56 reciprocally movable therein. Extending forwardly of the piston 56, i.e. to the right as shown in FIGURE 1, is a piston rod 58 having its outer end 60 coupled with the outer end 50 of the slide member 40 by means of a pin 62. Suitable fluid couplings 70 and 71 are provided within the housing 54 whereby fluid under pressure may be passed through the couping 71 to cause the piston to move outwardly, i.e. to the left as shown in FIGURE 1; and similarly fluid may be introduced within the coupling 70 to cause the piston to move inwardly, i.e. to the right as shown in FIGURE 1. It will be appreciated from this discussion that when fluid is introduced under pressure through the coupling 70, and the coupling 71 being connected with a sump, the piston rod 58, and in turn the slide member 40 are caused to move to the right as shown in FIGURE 1, or toward closing position of the mold platens 1 and 2. Similarly, when fluid under pressure is fed to the coupling 71, with the coupling 70 connected with a sump, then the mold platen 1 moves to the left, or open position in FIGURE 1.

The construction of the oppositely disposed piston and cylinder means 52' corresponds identically with that of the piston and cylinder means 52. Thus, as fluid under pressure is introduced to the coupling 70', the piston rod 58' is caused to move to the left as shown in FIGURE 1, thereby in turn moving the slide member 42 to the left as shown. Conversely, when fluid under pressure is introduced to the coupling 71', with the coupling 70' connected with a sump, the piston rod 58' is caused to move to the right, thus likewise moving the slide member 42 to the right.

If, consistent with the invention, fluid under pressure is introduced to the couplings 70 and 70' simultaneously, then, as stated, the respective slide members 40 and 42 move toward one another, thereby carrying the mold platens 1 and 2 toward one another. However, the piston and cylinder means 52 and 52' are of the low powered type, and need only provide sufficient force to move the platens toward one another or away from one another. The piston and cylinder means 52 and 52' are not primarily responsible for maintaining the mold platens 1 and 2 in fixed relative position when separating forces are applied therebetween. Thus, the piston and cylinder means 52 and 52' can be replaced by any suitable mechanical, electrical or hydraulic means which serve the desired function, namely the function of moving the platens 1 and 2 into and out of mold closing position.

While the provision of the plate member 14 has been found particularly satisfactory, and the use thereof in various forms is within the scope and spirit of the invention, the preferred embodiment hereof contemplates reinforcing the plate member 14 with a plurality of upstanding ribs 80 which project radially of the plate member 14, and which may be integral therewith or secured thereto by any suitable means, such as welding, or the like. Moreover, for further reinforcing purposes, preferably a plurality of similar laterally extending ribs or braces 82 and 84 on the plate and extending between ribs 80 are provided, this insuring rigidity of the ribs 80 and positive support of the plate member 14.

As suggested at the outset of this description the plate member 14 is rotatable about the axis of shaft 3, with rotation of such shaft. To properly support the plate member 14 for rotation, as aforesaid, a support arrangement including a plurality of annular support structures or posts 90 is utilized, even though only one of them is shown. Disposed at the upper end of each of the posts is a bearing such as that designated by the numeral 92. The bearing 92 preferably includes a pair of cooperating rings 94 and 95 having a series of ball bearings 98 disposed therebetween. Such bearing arrangement serves to support the plate 14 at points radially spaced from the rotational shaft 3.

Figure 3:
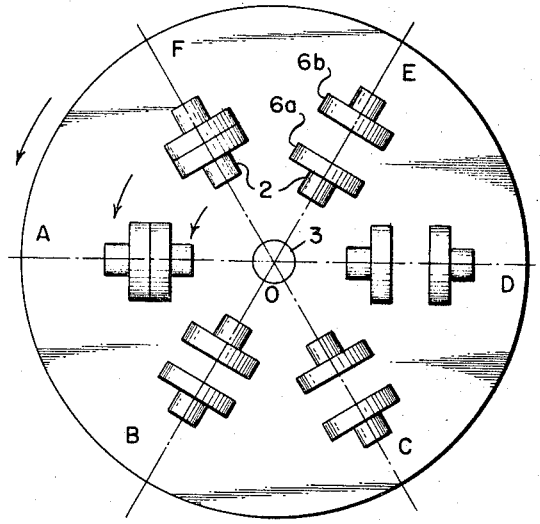
FIGURE 3 is a schematic plan view of an overall machine constructed in accordance herewith and embodying the apparatus shown in detail in FIGURES 1 and 2.

By virtue of the rotational mounting of the plate 14, and the support thereby of the mold platens, the slide members, and the piston and cylinder means, each mold means, and its associated supporting and moving components, is rotatable with the plate 14. As shown schematically in FIGURE 2, all of the mold means are in radial alignment with one another, i.e., the centers are equi-distantly spaced from the rotational axis of the shaft 3. Thus, with rotation of the plate 14, the respective mold means can be arcuately moved from one position to another in a circular path. At one of such positions, and specifically the position O-A as shown in FIGURE 3, the operable or separable mold means there located is closed subjected to a molding pressure for forming an article therein. The operation performed at this station results in subjecting the platens 1 and 2 to separating forces. Thus, in accordance with the invention, at this station there is provided a means, separate from the piston and cylinder means 52 and 52' discussed above, for maintaining the mold platens 1 and 2, and thereby the split mold sections together in fixed engagement.

By again referring to FIGURE 1, it will be noted that an auxiliary base or support structure, generally designated by the numeral 100, is provided in juxtaposition to the underside of the plate 14. The base structure 100 has a central depressed area 102 disposed between upstanding legs or end portions 104 and 106 thereof. The depressed area 102 is provided to permit the passage therein of mold platens 1 and 2 of each of the split mold means as plate 14 is rotated, and to similarly permit the passage therein of the lower ends of the head portions 22 of each of the slide brackets 40 and 42.

Moreover, fixed to the outer extremity of each of the upstanding end portions 104 and 106 of the base structure 100 are force applying devices for maintaining the molds closed. Each of the force applying devices in essence includes its own support structure 110 which has a central recess area 112 therein. A base member 114 is reciprocal within the recess area 112, and the base member 114 carries thereon a fulcrum shaft 116. Supported on the fulcrum shaft 116 is a force applying lever 118. The base member 114 is movable from a position where its lower end 120 abuts against the lower inner face 122 of the support structure 110 to a position where the forward end 123 of the base member abuts against the forward inner face 125 of the support structure 110. This movement is a sliding movement, as described more fully below, and results in moving the lip or jaw 130 of the lever member 118 from a position outside of or below the path of movement of the slide member 42, to a position within the path of movement of the slide member 42 and in engagement with the lower part of the rear end 50 of the member 40. In other words, the lip 130 of the lever member 118 is movable from a retracted position outside of the path of movement of the end 50 of the slide member 40, to a position where the lip 130 is engageable with the end 50.

The force applying device 12' is identical with the force applying device 12. The only difference between the devices lies in the fact that the force applying device 12' faces in the opposite direction as the force applying device 12. Each of the devices, as described more fully below, operates initially to slide the lip 130 or 130' of the lever member 118 or 118' into the path of, and in engagement with, the rear or outer end of its associated slide member, and to then pivot the lever member 118 or 118' about the pivot shaft or fulcrum 116 or 116', thereby pressing the slide members 40 and 42 toward each other, and in turn correspondingly pressing the mold platens 1 and 2 toward each other.

It is to be noted that the end portion of each of the slide members 40 and 42 disposed remote from the head portion 43 and 45 thereof respectively is larger than the connected piston rod 58 and 58' respectively, thereby providing a shoulder at the ends 50 and 51 respectively, which shoulders are engaged by the lips 130, 130' of the lever members 118 and 118' respectively. The pivoting of the lever members 118 and 118' forces the mold platens 1 and 2 together under substantial pressure, thus eliminating the possibility of separation of the same while they are subjected to the internal separation pressure during an injection blow molding operation.

It will be understood that the force applying devices 12 and 12' can be mounted on the base structure 100 in any suitable manner, as by welding, bolts, or the like.

*General operation*

In operation, the support structure or plate 14 is rotated whereby one of the mold means 6 is disposed in position O-A in FIGURE 3. At this time, the piston and cylinder means 52 and 52' have moved the split mold sections 6ª, 6ᵇ into closed position, i.e. the platens 1 and 2 have been moved toward one another, and the mold sections carried thereby are moved into engagement. Then, when the particular split mold is disposed in station O-A, the force applying devices 12 and 12' are operated whereby the lever members 118 and 118' thereof slide upwardly and into engagement at 130, 130' with the outer ends 50 and 51 of the slide members 40 and 42. By virtue of the action of the force applying devices, the lever members 118 and 118' pivot about the respective fulcrum shafts 116 and 116' thereby pressing the mold sections 6ª, 6ᵇ into tight, holding contact with each other.

Simultaneously, with the securing of the mold sections together, the molding operations are carried out. Once the injection, blow forming, or the like operation is completed, the force applying devices 12 and 12' are released whereby the jaws of the lever members 118 and 118' are no longer forced against the ends 50 and 50' of the slide members 40 and 42, and then the lever members are withdrawn or slid downwardly, as shown in FIGURE 1. Thereafter, the support structure plate 14 is advanced so that the next arcuately adjacent sectional mold moves into position O-A, and the above described operation is again carried out. Accordingly, the force applying devices 12, 12′ are fixed in position relative to the support structure for thrusting against each mold means when the mold means are disposed in at least one predetermined rotational position whereby as the support means is intermittently rotated, the clamping devices likewise perform their mold-engaging function sequentially.

The above described arrangement and operation are effective in normal injection blow molding operations of heavy moldable material. The forming and shaping to a finished form of the heavy material requires substantially higher internal adjusted fluid pressure to control the expansion of the molded article. Under these conditions, the opening and closing of the molds as well as the feeding, blowing and pressing operations are all performed at one station (as for example, at station O-A in FIGURE 3). After those operations, which require maximum resistance to the mold-separating forces, have been performed the machine is indexed to carry that particular set of mold sections away from station O-A and allow sufficient time for the molded part to cool while pressure is maintained by the mold moving means 52, 52′. The mold can be opened and the molded piece removed just before the mold parts return to the feeding, blowing and pressing station O-A, or even after return to station O-A.

For the above described method of operation, the details of the force applying devices to be used are more fully disclosed in my copending application Ser. No. 206,508 filed June 29, 1962 (FIGURES 8 to 11) and accordingly are not shown in detail herein. It is understood, however, that the particular form of force applying device used herein may be varied. For example, the devices described in my co-pending application Ser. No. 173,103 filed Feb. 13, 1962, now Patent No. 3,241,187, might well be used herein in place of the devices described in FIGURES 8 to 11 of Ser. No. 206,508, now Patent No. 3,241,827.

After considering the foregoing description it will be appreciated that in the above described embodiment, the slide members 40, 42 move simultaneously past the force applying devices, and thereafter the force applying elements of the force applying devices move upwardly and then into force applying position. More specifically, as shown in the schematic representations of FIGURES 5a through 5d, as the mold sections close, the slide member 40 progressively moves to the right as shown, past the locking device 12 and the mold engaging jaw 130 thereof. FIGURE 5a shows these respective elements in their initial position, FIGURE 5b shows the member 40 as moved to its closed mold position, FIGURE 5c shows the locking device 12 as initially moved upwardly adjacent the end of the inwardly moved slide member 40, and FIGURE 5d shows the device 12 with the lever engaging lip 130 thereof engaging the end of the slide member 40 to lock it with the mold in secured position.

In other types of operation, and in some particular applications involving formation of light weight hollow plastic parts (commonly known in the trade as "the parison") where pre-selected substantially constant pressure forming is needed, the separable split mold part can be moved to closed or engagement position prior to rotation or movement thereof into a position where they are clamped. Specifically the mold can be closed in one position, and then, as closed, moved to another position where the blowing and clamping operation creating the separating force is performed. In this type installation, the feeding operations may be performed for example, as shown in FIGURE 3, at station O-F; while the sealing and the blowing in a finished form may be performed at any other desired station, preferably the adjacent one, such as station O-A. The timing rate of rotation of the mold platens between the various stations may also be varied. The timing at each station may be equal or unequal or varied as required by the process. Consequently the speed of the operating cycle between two stations such as O-F and O-A, or at any point between said two stations, will be faster than the speed between the other stations. A simplified construction of the mold securing devices particularly adapted to this type of operation will now be described.

Figure 4:
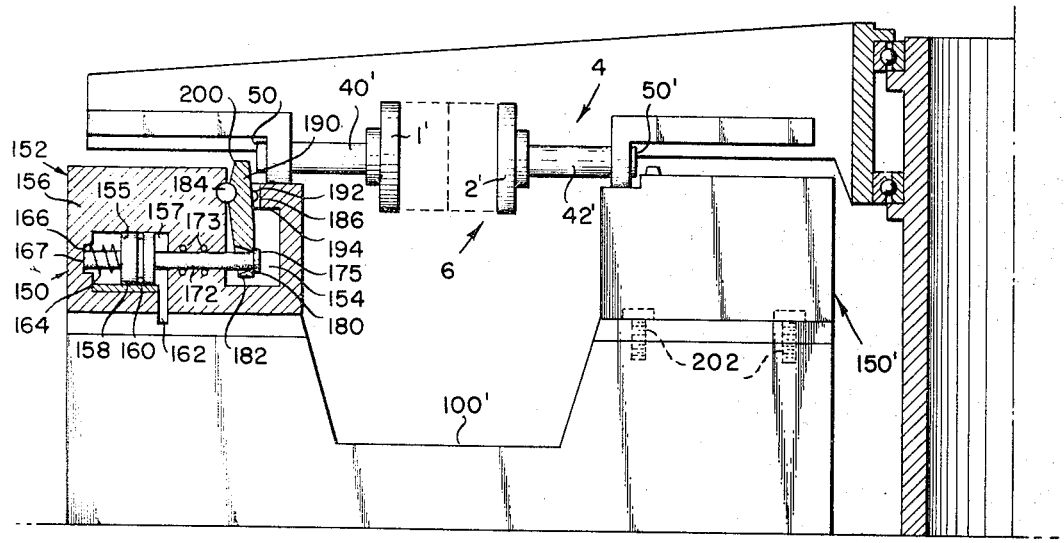
FIGURE 4 is an enlarged side view, partially in section, presenting a preferred modification of the present invention.

By referring to FIGURE 4 which illustrates the structure of the simplified arrangement, it will be noted that there is a support structure 4′, a pair of mold supporting platens 1′ and 2′, and a slide member 40′ corresponding to parts designated by the same primary number shown in FIGURE 1. With the arrangement of FIGURE 4, however, it is assumed that the machine with which this invention is used includes means, functioning like the means 52, 52′ of FIGURE 1 for moving the mold components to the closed position shown in FIGURE 1 prior to the arrival of such components in such location. Specifically, it is assumed that such means are provided which, at position O-F in FIGURE 3, at least, relatively move the platens 1 and 2 to closed position whereby the radially outer end 50 of the slide member 40 is disposed in its innermost position. This operation can be achieved, for example, by using the piston-cylinder means 52 of the first embodiment, or by cams or other means to effect this relative closing movement. Still further, as an example, the cooling may be effected from position O-A to position O-D with the separating, cutting or ejecting operations to be effected in position O-E, and the feeding to be effected in position O-F as stated hereabove.

It will be further understood that at any station, the piston-cylinder means 52 and 52′ can be operated to move the mold platens 1′ and 2′ to a fully open position so as to permit the removal of the article formed within the mold before the completion of a cycle. The selection of the operations performed at a particular stations depends upon the particular molding conditions; but it should be readily apparent that the arrangement provided hereby, and discussed in detail above, provides the proper mold clamping or closure securing at the desired location with a minimum number of parts, and yet with a relatively high force.

As noted above, moving the platens and the slide members to their closed position prior to the arrival thereof at the location where they are to be locked or pressed closed, permits the use of a somewhat simplified force applying locking device. More particularly, if the movable mold sections are closed at position O-F, then they can be moved in closed position to position O-A and supporting means for the lever 118 and its engaging lip 130 can be permanently disposed in a position adjacent the path defined by the outer end 50 of the slide member 40. In this instance, there is no need to provide force applying devices having portions which are movable out of the path of reciprocation of the slide members 40′, 42′; because the slide members have relatively moved sufficiently toward one another previously at the immediately prior location, and no further reciprocal movement is required at the clamping or pressing position or station. The parts may thus go directly from the condition of FIGURE 5b to FIGURE 5d, the upward movement at FIGURE 5c being omitted.

In the embodiment shown in FIGURE 4 the mold platens and their slide members 40′, 42′ are carried on a plate corresponding to plate 14 of the first embodiment, and the locking means for the mold are correspondingly located at one position. However the securing device generally designated 150, takes the place of the securing structures 12 and 12′ in FIGURE 1. While only one securing device with one of the mold platens is shown in FIGURE 4, it is to be clearly understood that, if desired, another identical securing device may be used in conjunction with the other mold platen in the manner shown in FIGURE 1.

Referring to FIGURE 3, with rotation of the support means 40, the slide member 40' and platens 1' and 2' rotate from station O-F to station O-A in the disposition shown in this FIGURE. The force applying securing devices 150 have accordingly been fixed on the base support 100' whereby said securing devices are operable upon merely a single pivoting movement to lock the mold parts closed.

The securing device generally designated 150 comprises a support structure of block 152 having a recessed area 154 in the forward or right-hand end portion thereof, i.e. the radially inner end, and a piston chamber 156 in the rear or left hand end portion thereof. The block 152 is shown schematically as a unitary body, but it will be appreciated that for purposes of fabrication, the same would preferably comprise a series of releasably joined component parts.

Disposed within the chamber 156 is a piston 158 preferably carrying a sealing O-ring 160. The piston 158 slidably engages the side walls of chamber 156 with the O-ring 160 providing a conventional seal therearound. Communicating with the interior of the chamber 156 in advance of the forward face 157 of piston 158 is an inlet passageway 162. Disposed in a socket 164 in the rear wall of chamber 156 is a spring biasing means 166 preferably in the form of a simple coil spring for normally urging piston 158 to the right in FIGURE 4. The spring 166 is compressible between the rear face 155 of piston 158 and the bottom wall 167 of socket 164.

Extending forwardly from piston 158 is a piston rod 170 which passes slidably through a bore 172 having sealing O-rings 173 disposed peripherally thereof to seal and slidably engage piston rod 170. The forward end of piston rod 170 is enlarged to form a head 175, and bears against the right face as shown of a lever member 180. The lever member 180 has a tapered bore 182 extending through the bottom end portion thereof through which piston rod 170 freely extends so as to provide a one-way engagement of the piston rod head 175 with the lever member 180, and the connection of such head through the rod 170 with the piston 158. The support structure carries a horizontally extending fulcrum member 184 disposed partially within the vertically extended restricted opening 186 leading downwardly into the recess 154, and the forward or upper end portion of the lever member 180 is pivoted on fulcrum member 184. Preferably, an arcuate recess 190 is provided in the left face of the lever member 180 as shown to receive the fulcrum member 184; and an arcuate bearing cam surface or projection 192 of predetermined radius extends from the right face of the lever member 180, as shown, into tight engagement at all times with the bearing face 194 on the right side of the restricted opening 186 to continuously maintain the lever member seated on its fulcrum support.

With the above arrangement, the spring means 166 normally urges the piston 158 to its retracted position, i.e. to the right as shown in FIGURE 4. With the piston so disposed, the head 175 of the piston rod permits the lever member 180, by reason of its shape and position, to tilt through normal gravitational action to the position in which it is shown in solid lines in FIGURE 4. When, however, fluid under pressure, i.e. hydraulic fluid, compressed air or the like is fed into the cylinder inlet passage 162, the piston 158 is forced to the left in FIGURE 4, and spring means 166 is thereby compressed between the face 155 of the piston 158 and the vertical wall or base 167 of socket 164. Movement of the piston in this manner, causes reciprocal rearward movement of the piston rod 170, and in turn causes the head 175 thereof to move to the left. Engagement of the head 175 with the right face of the lever member 180 results in pivoting the lever member clockwise about its fulcrum 184, and thus the lip or jaw portion 200 of the lever member 180 engages the end 50 of slide member 40 pressing the same to the right to thrustingly engage the end of slide 40'.

It will be appreciated that the securing device 150 can be fixedly mounted on the base structure 100' in any suitable way. The mounting arrangement and the position of the inlet passage 162 should be such as to readily permit the introduction of fluid through the inlet passage from any desired conventional source of fluid under pressure.

The foregoing described modification greatly simplifies the operation and reduces the number of movements involved in the first described arrangement, at least insofar as the applying, clamping, or securing devices are concerned, and the basic structure of these clamping devices in the instant embodiment operates generally the same as that set forth in FIGURES 8 to 11 of my prior application Ser. No. 206,508 referred to more particularly above. The construction of the base support structure or block 152 for support of the fulcrum member 184 can be simply achieved, and while the use of the cam surface or arcuate projection 192 is found convenient and effective for maintaining the lever member 180 in proper position, any other suitable means may be used for this purpose.

Even though the above disclosed embodiments of the invention have been described in conjunction with molding arrangements wherein pairs of mold platens are movable toward and away from one another, it should be apparent that the invention is likewise applicable to systems wherein one of the mold platens, sections or parts, is fixed and the other is movable and accordingly only a single force applying securing device would be used as opposed to pairs of such devices.

Similarly, the particular arrangements for feeding and filling the mold sections and various other parts of the rotary molding machine are not detailed herein as they form no part of the present invention.

While the invention has been shown and described in accordance with the patent statutes, it is to be understood that various changes in the details of the structure may be made without departing from the spirit of the invention. It is therefore intended that the invention be limited only by the scope of the appended claims.

What is claimed is:

1. In a machine for automatically forming molded articles, a rotatable support means, a plurality of split mold means on said rotatable support means for movement between a plurality of rotational positions, means supporting said mold means on said rotatable support means for opening and closing movement of said mold means, means for relatively moving each of said plurality of mold means into and out of closing position, all of said plurality of mold means being located substantially equidistantly of the axis of rotation of said rotatable support means, and a pair of force multiplying securing devices fixed in position relative to said rotatable support means for clamping said mold means tightly closed when each said mold means are disposed in one predetermined rotational position, each of said devices including a fulcrum carried by a support structure, a lever member mounted on said fulcrum, said lever member disposed beyond said rotatable support means, said lever member being pivoted about said fulcrum, said lever member having its structural mass located in such a manner as to be responsive to gravitational force to normally tilt it about said fulcrum in one direction, further means including a piston reciprocable in a chamber disposed in said support structure, and a fluid pressure inlet to said chamber for entry of fluid under pressure to move said piston in a direction causing pivotal movement of said lever member in a direction opposite said one direction, whereby as each said split mold means is intermittently and sequentially rotated to said closing position, said securing devices sequentially clamp each said split mold means at said closing position.

2. The machine of claim 1 wherein said piston has a piston rod coupling said piston with said lever member.

3. The machine of claim 1 wherein said lever member has a projecting lip which is disposed beyond said support structure.

4. The machine of claim 1 wherein said lever member is disposed generally transversely of the path of movement of said means for moving said mold means into and out of closing position.

5. The machine of claim 1 wherein said piston is disposed to move in a substantially vertical direction.

References Cited

UNITED STATES PATENTS

| | | | |
|---|---|---|---|
| 732,833 | 7/1903 | Davison et al. | |
| 1,195,126 | 8/1916 | Witthoefft. | |
| 1,614,601 | 1/1927 | Davis | 18—20 |
| 1,841,490 | 1/1932 | Maynard. | |
| 1,955,343 | 4/1934 | Rice | 18—33 |
| 2,515,093 | 7/1950 | Mills | 18—5 |
| 2,579,390 | 12/1951 | Mills | 264—99 |
| 2,585,297 | 2/1952 | Beuscher | 18—30 X |
| 2,618,823 | 11/1952 | Perkon | 18—30 X |
| 2,750,625 | 6/1956 | Colombo | 18—5 |
| 2,775,790 | 1/1957 | Lappin et al. | 18—33 |
| 2,960,739 | 11/1960 | Warr | 24—134 |
| 2,964,765 | 12/1960 | Schaich | 264—99 |
| 2,988,778 | 6/1961 | Chaze et al. | 18—30 |
| 3,005,235 | 10/1961 | Patera | 18—30 |
| 3,165,796 | 1/1965 | McDonald | 18—30 X |
| 3,173,176 | 3/1965 | Kobayashi | 18—30 |

J. SPENCER OVERHOLSER, *Primary Examiner.*

J. HOWARD FLINT, JR., *Examiner.*